(12) United States Patent
Nakamura et al.

(10) Patent No.: US 7,810,878 B2
(45) Date of Patent: Oct. 12, 2010

(54) VEHICLE BODY STRUCTURE

(75) Inventors: Takuo Nakamura, Okazaki (JP);
Katsuhiko Takashina, Okazaki (JP);
Hiroaki Kano, Okazaki (JP); Hayami Nakagawa, Anjo (JP); Satoshi Yanagimoto, Susono (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/055,048

(22) Filed: Mar. 25, 2008

(65) Prior Publication Data

US 2008/0238150 A1   Oct. 2, 2008

(30) Foreign Application Priority Data

Mar. 30, 2007  (JP)  ............... P2007-093363

(51) Int. Cl.
*B62D 21/02* (2006.01)
(52) U.S. Cl. ............................... 296/203.02
(58) Field of Classification Search ........ 293/133; 296/187.08, 187.09, 187.1, 193.07, 193.09, 296/203.02, 204, FOR. 115
See application file for complete search history.

(56) References Cited

U.S. PATENT DOCUMENTS

| | | | | |
|---|---|---|---|---|
| 3,034,823 A * | 5/1962 | Hinka et al. | ............... | 296/204 |
| 3,827,525 A * | 8/1974 | Felzer | ............... | 180/232 |
| 4,186,957 A * | 2/1980 | Lutze et al. | ............ | 296/203.02 |
| 4,406,343 A * | 9/1983 | Harasaki | ............ | 180/297 |
| 4,804,222 A * | 2/1989 | Sakiyama et al. | ...... | 296/203.02 |
| 4,840,423 A * | 6/1989 | Maekawa | ............ | 296/203.02 |
| 4,900,082 A * | 2/1990 | Schwuchow et al. | ... | 296/203.02 |
| 4,909,565 A * | 3/1990 | Harasaki et al. | ........ | 296/187.09 |
| 5,074,587 A * | 12/1991 | Schwede et al. | ........... | 280/781 |
| 5,112,102 A * | 5/1992 | Wurl | ............... | 296/204 |
| 5,201,566 A * | 4/1993 | Mori | ............... | 296/192 |
| 5,346,276 A * | 9/1994 | Enning et al. | ........... | 296/203.02 |
| 5,562,329 A * | 10/1996 | Srock et al. | ............ | 296/203.01 |
| 5,806,918 A * | 9/1998 | Kanazawa | ............... | 296/204 |
| 5,882,065 A * | 3/1999 | Koiwa et al. | ........... | 296/203.02 |
| 6,003,935 A * | 12/1999 | Kalazny | ............... | 296/204 |
| 6,145,923 A * | 11/2000 | Masuda | ............... | 296/1.03 |

(Continued)

FOREIGN PATENT DOCUMENTS

DE            42 08 700 A1   10/1992

(Continued)

*Primary Examiner*—Glenn Dayoan
*Assistant Examiner*—Paul A Chenevert
(74) *Attorney, Agent, or Firm*—Birch, Stewart, Kolasch & Birch, LLP

(57) ABSTRACT

A vehicle body structure, includes: a pair of front side members, front ends of which are joined to both ends of a front bumper via impact absorbing portions, respectively; front-side-member upper members, which are arranged above the front side members, and front ends of which are connected to the front side members, respectively; front-side-member lower members, which are arranged below the front side members, and front ends of which are connected to the front side members, respectively; and a dash cross member, which extends in a widthwise direction of a vehicle body, and to which rear ends of the front-side-member lower members are joined. The dash cross member includes wall portions with which parts of the rear ends of the front-side-member lower members can be brought in contact, on a rear side of the vehicle body.

8 Claims, 8 Drawing Sheets

U.S. PATENT DOCUMENTS

| | | | |
|---|---|---|---|
| 6,179,372 B1 * | 1/2001 | Sakamoto et al. | 296/203.02 |
| 6,206,460 B1 * | 3/2001 | Seeliger et al. | 296/204 |
| 6,209,948 B1 * | 4/2001 | Mori et al. | 296/187.09 |
| 6,234,568 B1 * | 5/2001 | Aoki | 296/203.04 |
| 6,299,240 B1 * | 10/2001 | Schroeder et al. | 296/203.01 |
| 6,361,102 B1 * | 3/2002 | Han | 296/203.02 |
| 6,398,292 B2 * | 6/2002 | Tsuruta et al. | 296/187.09 |
| 6,588,832 B2 * | 7/2003 | Sakuma | 296/204 |
| 6,619,730 B2 * | 9/2003 | Porner | 296/204 |
| 6,679,546 B2 * | 1/2004 | Mishima et al. | 296/203.01 |
| 6,705,670 B2 * | 3/2004 | Forssell et al. | 296/187.09 |
| 6,805,401 B2 * | 10/2004 | Hayashi et al. | 296/204 |
| 6,811,211 B2 * | 11/2004 | Saito | 296/203.02 |
| 6,811,212 B2 * | 11/2004 | Kasuga | 296/205 |
| 6,817,657 B2 * | 11/2004 | Watanabe et al. | 296/203.02 |
| 6,857,691 B2 * | 2/2005 | Kuroda et al. | 296/203.02 |
| 6,893,078 B2 * | 5/2005 | Saeki | 296/187.09 |
| 6,908,129 B2 * | 6/2005 | Shimotsu | 293/133 |
| 6,938,948 B1 * | 9/2005 | Cornell et al. | 296/187.09 |
| 7,594,559 B2 * | 9/2009 | Kitoh et al. | 180/232 |
| 7,681,943 B2 * | 3/2010 | Murata et al. | 296/203.02 |
| 2003/0080587 A1 * | 5/2003 | Kitagawa | 296/194 |
| 2004/0256890 A1 * | 12/2004 | Nagafuchi et al. | 296/203.02 |
| 2007/0262577 A1 * | 11/2007 | Yasuhara | 280/784 |

FOREIGN PATENT DOCUMENTS

| | | | |
|---|---|---|---|
| DE | 699 21 921 T2 | | 11/2005 |
| DE | 10 2005 050 165 A1 | | 4/2006 |
| FR | 2536718 A1 | * | 6/1984 |
| JP | 63306985 A | * | 12/1988 |
| JP | 63306986 A | * | 12/1988 |
| JP | 01047683 A | * | 2/1989 |
| JP | 01254476 A | * | 10/1989 |
| JP | 02262475 A | * | 10/1990 |
| JP | 02293277 A | * | 12/1990 |
| JP | 03010975 A | * | 1/1991 |
| JP | 04005182 A | * | 1/1992 |
| JP | 04011580 A | * | 1/1992 |
| JP | 04050084 A | * | 2/1992 |
| JP | 04059489 A | * | 2/1992 |
| JP | 04063776 A | * | 2/1992 |
| JP | 04129882 A | * | 4/1992 |
| JP | 2006-143178 A | | 6/2006 |

* cited by examiner

VEHICLE BODY STRUCTURE

BACKGROUND OF THE INVENTION

1. Field of the Invention

The present invention relates to the vehicle body structure of an automobile.

2. Description of the Related Art

The structure of a front portion of a vehicle body of an automobile is configured such that front side members which extend in the vehicle-body longitudinal direction are arranged in the vehicle-body widthwise direction at the front portion of the vehicle body. An engine, a transmission and the like are arranged between the respective front side members. By taking a position of a front wheel when a steering wheel is steered at maximum (hereinafter, referred to as "at the time of maximum steering") into consideration, to avoid the position of the front wheel at the time of maximum steering from interfering with the front side member, a recessed portion is formed in a vehicle-body longitudinally middle portion of the front side member in a state that the recessed portion extends toward a vehicle-body widthwise inner side from a vehicle-body widthwise outer side. Further, with respect to the mode of deformation of the front side member which exhibits the maximum absorption quantity of collision energy of an automobile at the time of collision, a case in which the front side member is axially collapsed from a front end of the front side member to a rear end of the front side member is named.

When the recessed portion is formed in the front side member as in the case of the front side member structure of the related art, a cross-sectional center line of the front end of the front side member and a cross-sectional center line of the recessed portion are displaced from each other in the vehicle-body widthwise direction. Further, to compare a transverse cross-sectional area of the front end of the front side member and a transverse cross-sectional area of the recessed portion of the front side member, the transverse cross-sectional area of the recessed portion of the front side member is set smaller than the transverse cross-sectional area of the front end portion of the front side member. Accordingly, the recessed portion of the front side member forms a fragile portion. With an input which acts along the cross-sectional center line of the front end of the front side member, a bending moment in the vehicle-body widthwise direction is liable to be generated in the vehicle-body longitudinally middle portion of the front side member thus giving rise to the possibility that the recessed portion of the front side member is deformed prior to the deformation of the front end portion of the front side member at the time of collision.

In view of the above, the applicant of the present invention proposed the following vehicle body structure in JP-A-2006-143178. The vehicle body structure is configured such that to rear ends of a pair of front side members which have front end thereof respectively joined to both ends of a front bumper by way of impact absorbing portions, front-side-member upper members and front-side-member lower members which are arranged above and below the respective front side members are connected. Due to such a constitution, collision energy of an automobile at the time of collision is dispersed from the front side members to the front-side-member upper members and the front-side-member lower members arranged above and below the front side members thus absorbing the energy at the time of collision.

Although the vehicle body structure proposed in JP-A-2006-143178 can absorb the energy at the time of collision, the vehicle body structure is still less than optimum with respect to a point which allows the automobile to more efficiently absorb energy at the time of collision or with respect to collapse property. Particularly, with respect to the collapse property of the front-side-member lower member, it is ideal that the member sequentially collapses from a front end side and hence, a joint strength of a rear end side of the front-side-member lower member becomes important. The strength may be imparted to the joint structure by adding a reinforcing bracket or by increasing the number of bolts which constitute fastening members. Such provisions, however, give rise to the increase of the number of parts and the assembling man-hours and, at the same time, give rise to the increase of a weight of the automobile.

SUMMARY OF THE INVENTION

It is therefore an object of the invention to provide a vehicle-body structure which can enhance the absorption performance of collision energy and the collapse property at the time of collision without giving rise to the increase of the number of parts and assembling man-hours and the increase of a weight of an automobile by improving a joint structure of rear end sides of front-side-member lower members.

In order to achieve the object, according to the invention, there is provided a vehicle body structure, comprising:

a pair of front side members, front ends of which are joined to both ends of a front bumper via impact absorbing portions, respectively;

front-side-member upper members, which are arranged above the front side members, and front ends of which are connected to the front side members, respectively;

front-side-member lower members, which are arranged below the front side members, and front ends of which are connected to the front side members, respectively; and a dash cross member, which extends in a widthwise direction of a vehicle body, and to which rear ends of the front-side-member lower members are joined, wherein the dash cross member includes wall portions with which parts of the rear ends of the front-side-member lower members can be brought in contact, on a rear side of the vehicle body.

The dash cross member may be connected to a pair of side sills which are arranged in the widthwise direction of the vehicle and extend in a longitudinal direction of the vehicle, and floor members which are arranged parallel to the side sills.

The rear ends of the front-side-member lower members may include mounting portions having shape conforming to the wall portions.

DETAILED DESCRIPTION OF THE INVENTION

Figure 1:
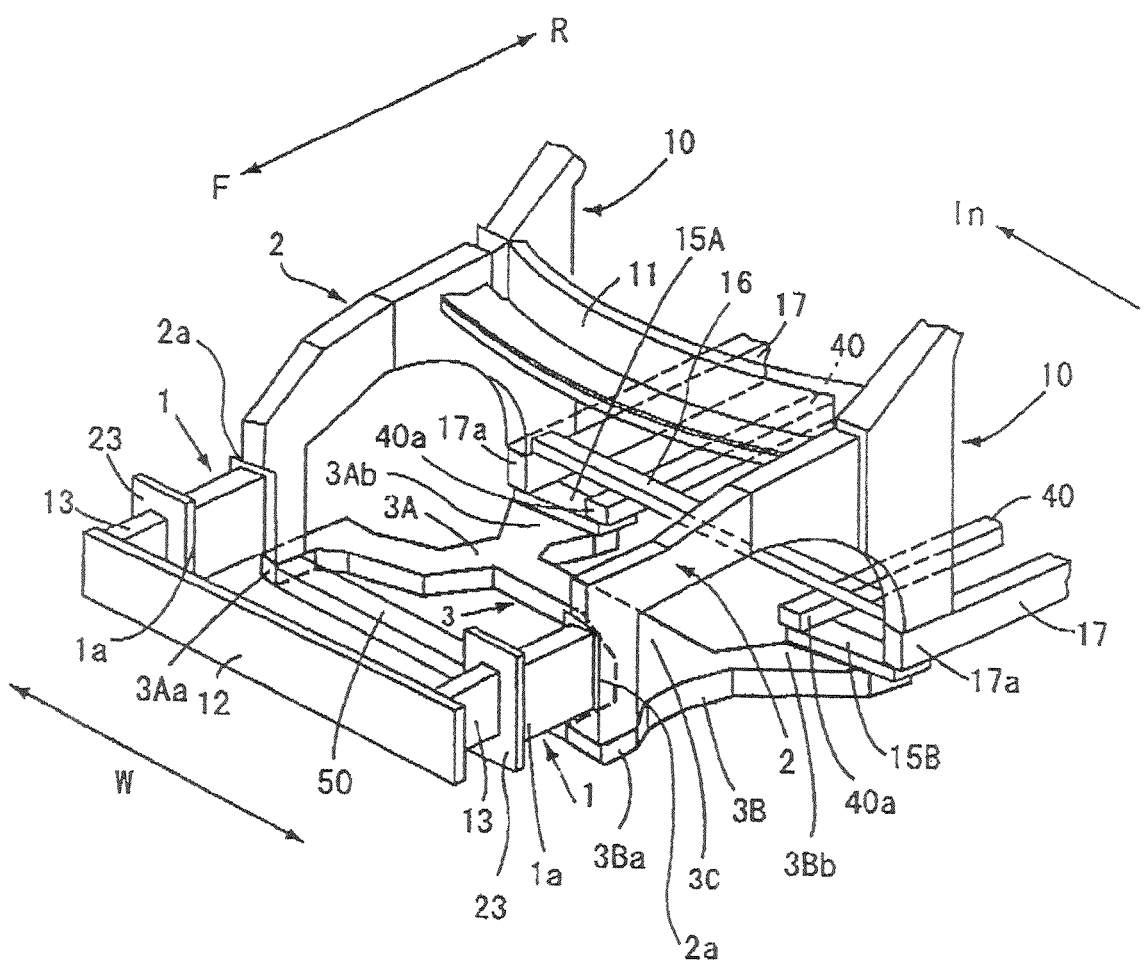
FIG. 1 is a perspective view showing a vehicle body structure according to the present invention as viewed from above a vehicle body.
Figure 2:
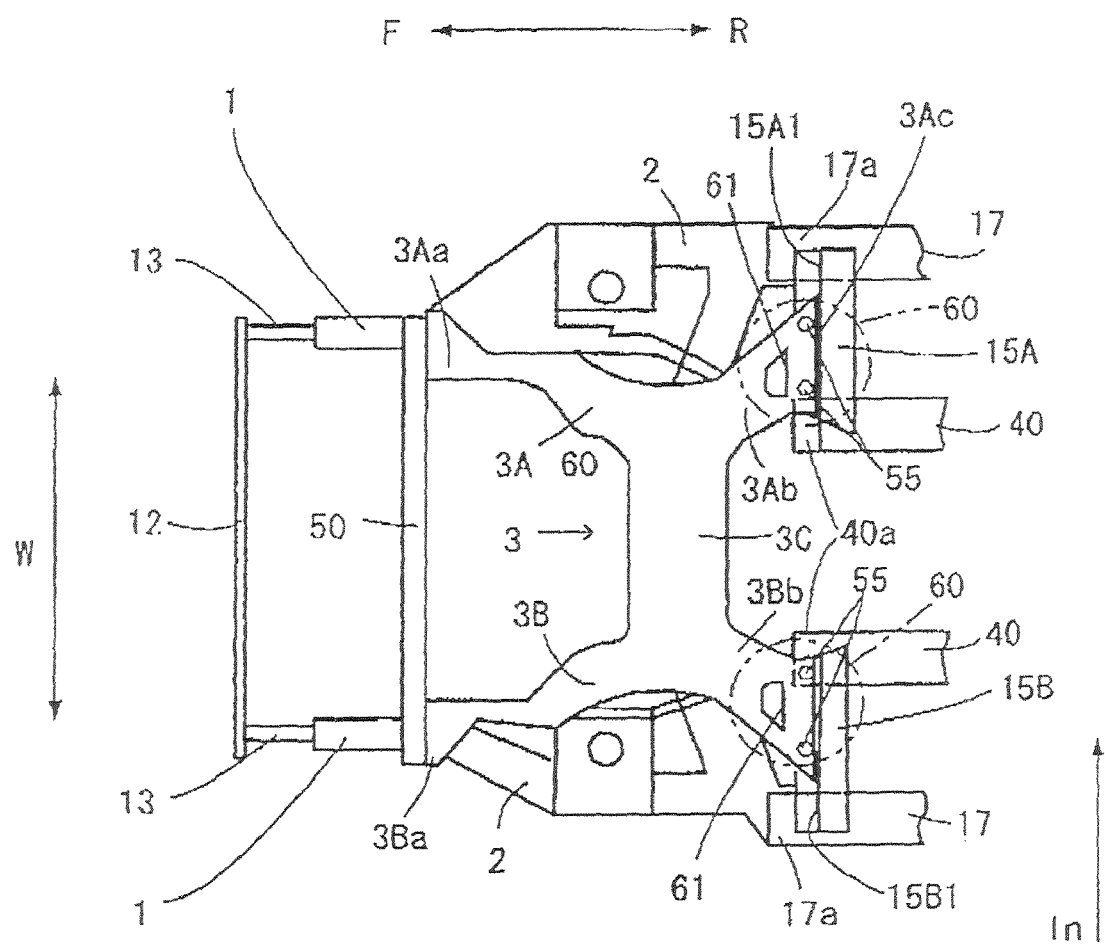
FIG. 2 is a plan view showing the vehicle body structure according to the present invention as viewed from below the vehicle body.

An embodiment of the present invention is explained hereinafter in conjunction with drawings. In the drawings, symbol F indicates a front side of the vehicle body, symbol R indicates a rear side of the vehicle body, symbol W indicates the vehicle-body widthwise direction, and symbol In indicates a vehicle-body widthwise inner side. As shown in FIG. 1 and FIG. 2, the vehicle body structure according to the present invention is configured such that upper portions of left and right front pillar lower members 10 are joined to each other by a cowl top 11, and middle portions of the respective front pillar lower members 10 are joined to each other by a dash cross member upper member 16. A cabin, not shown in the drawing, is formed on a vehicle-body-direction side of the front pillar lower members 10.

Below the respective front pillar lower members 10, a pair of side sills 17, 17 which is arranged in the vehicle-body widthwise direction W and extends in the vehicle-body longitudinal direction FR, and floor side members 40, 40 which are arranged parallel to these side sills 17, 17 and extend in the vehicle-body longitudinal direction FR are arranged. Front ends 17a, 17a of the respective side sills are respectively joined to lower portions of the respective front pillar lower members 10 by welding or the like. Front ends 40a, 40a of the respective floor side members are joined to the front ends 17a, 17a of the respective side sills by way of dash cross member lower members 15A, 15B which extend respectively in the vehicle-body widthwise direction W by welding or the like. In this embodiment, the dash cross member lower members 15A, 15B do not extend over a whole region in the vehicle-body widthwise direction, and have a length sufficient to connect the respective side sills 17 and the respective floor side members 40 to each other. The dash cross member lower members 15A, 15B are more light-weighted than dash cross member lower members of the related art which extend over the whole vehicle-body widthwise region and also constitute one element for ensuring strength of a cabin.

On the vehicle-body front side F positioned in front of the respective front pillar lower members 10, a pair of left and right front side members 1, 1 which has front ends 1a, 1a thereof respectively joined to both ends of the front bumper 12 by way of impact absorbing portions 13, 13, a pair of left and right front-side-member upper members 2, 2 which is arranged above the respective front side members 1 and has front ends 2a, 2a thereof respectively connected to the respective front side members 1, and a front-side-member lower member 3 which is arranged below the respective front side members 1 and has front ends 3Aa, 3Ba thereof respectively connected to the respective front side members 1 are arranged.

Figure 3:
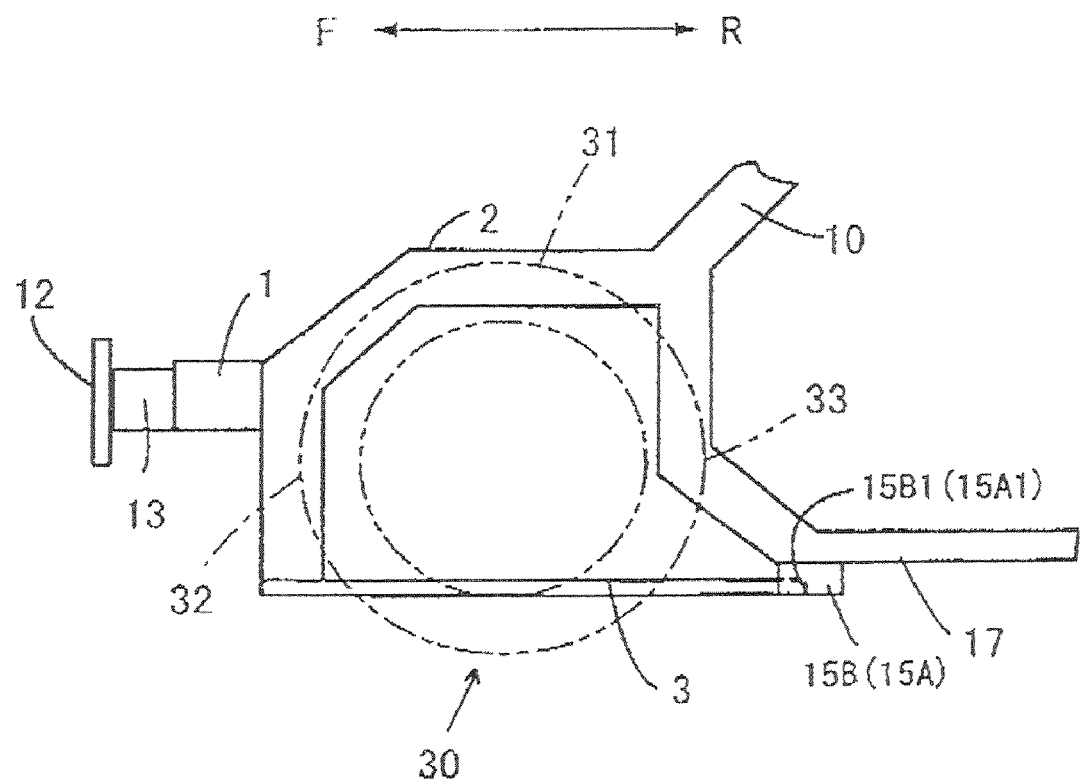
FIG. 3 is a schematic constitutional view showing the relationship between the vehicle body structure and a front wheel according to the present invention as viewed from a side of the vehicle body.

The front-side-member upper members 2, 2 are, as shown in FIG. 3, arranged above a center axis of a front wheel 30. As shown in FIG. 3, although the front-side-member upper members 2, 2 and top portions 31 of the respective front wheels are respectively positioned at the substantially same height, a front inner side 32 of the front wheel 30 or a rear inner side 33 of the front wheel 30 which may interfere with the front-side-member upper members 2, 2 at the time of maximum steering is positioned lower than the front-side-member upper member 2 and hence, there is no possibility that the front-side-member upper member 2 interferes with the front inner side 32 or the rear inner side 33 of the front wheels 30.

As shown in FIG. 1 and FIG. 2, the front-side-member lower member 3 is constituted of arm portions 3A, 3B extending toward the front side of the vehicle body from the dash cross member lower members 15A, 15B at the substantially same height as the floor 4 below the center axis of the front wheel 30, and a base portion 3C which connects both arm portions to each other. The front-side-member lower member 3 is integrally formed by casting, for example.

A front cross member 50 which extends in the vehicle widthwise direction is connected between the front ends 3Aa, 3Ba of the respective arm portions 3A, 3B of the front-side-member lower member 3. Rear ends 3Ab, 3Bb of the front-side-member lower member 3 are formed in a fan shape which spreads in the vehicle-body widthwise direction W, and are respectively connected to the side sills 17 and the front side members 40 by fastening the rear ends 3Ab, 3Bb to the dash cross member lower members 15A, 15B using bolts 55.

Figure 4:
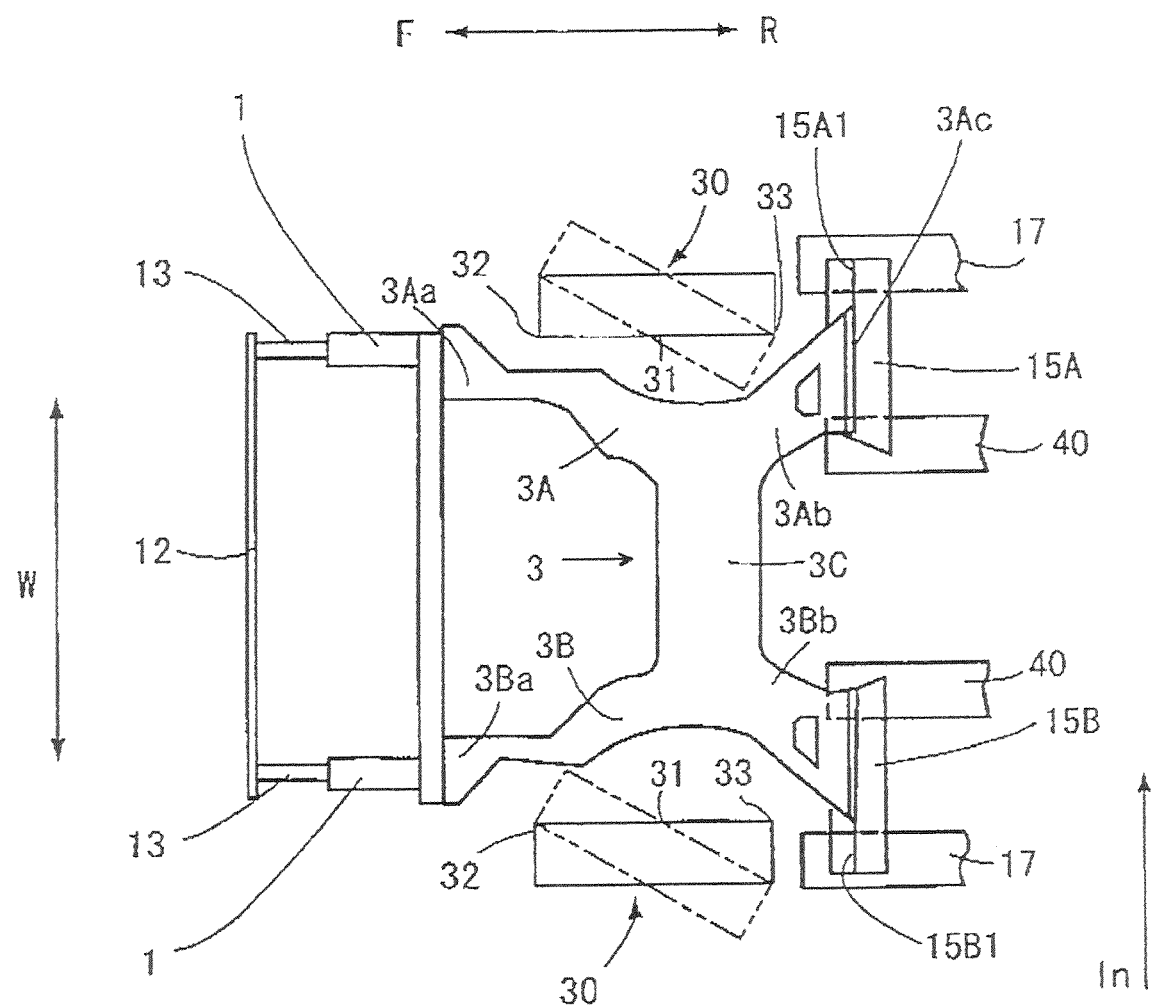
FIG. 4 is a schematic constitutional view showing the relationship between the vehicle body structure and the front wheel according to the present invention as viewed from above the vehicle body.

As shown in FIG. 4, in the arm portions 3A, 3B, in the same manner as the front-side-member upper members 2, 2, to prevent the front inner sides 32 or the rear inner sides 33 of the left and right front wheels 30 from interfering with the front-side-member lower member 3, recessed portions which extend toward the vehicle-body widthwise inner side In from the vehicle-body widthwise outer side is formed thus providing an approximately X shape as a planar shape of the front-side-member lower member 3. Accordingly, in the front-side-member lower member 3, the recessed portions are formed toward the vehicle-body widthwise inner side In positioned inside the front inner sides 32 of the front wheels 30 and the rear inner sides 33 of the front wheels 30 which may interfere with the front-side-member lower member 3 at the time of maximum steering and hence, there is no possibility that the front-side-member lower member 3 interferes with the front inner sides 32 or the rear inner sides 33 of the front wheels 30.

Figure 5:
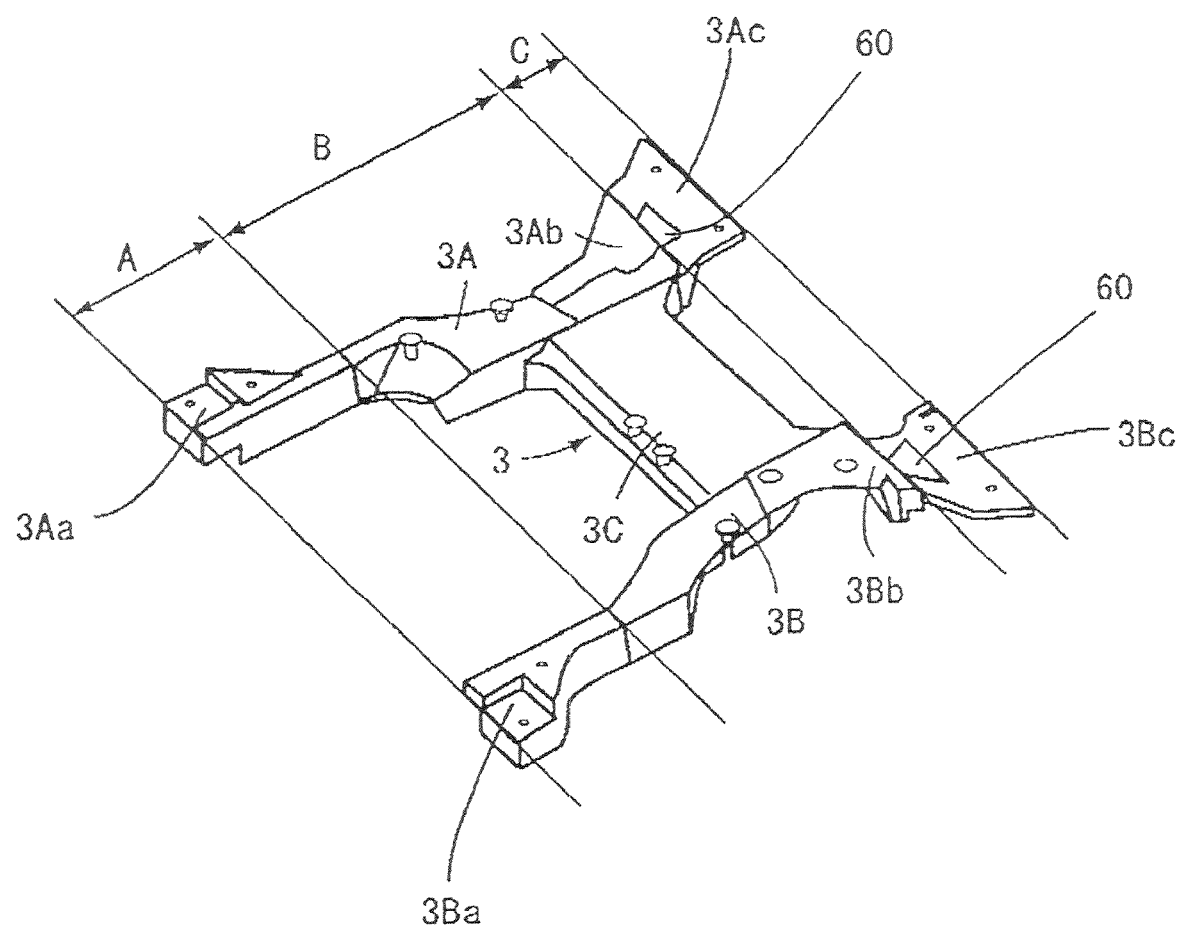
FIG. 5 is a perspective view showing the constitution of a front-side-member lower member of the present invention.

With respect to the front-side-member lower member 3, the front ends 3Aa, 3Ba are formed more fragile than the rear ends 3Ab, 3Bb. This structure is explained in conjunction with FIG. 5. With respect to plate thicknesses of the arm portions 3A, 3B, the plate thickness in a region indicated by symbol A where the front ends 3Aa, 3Ba are positioned is set smaller than the plate thickness in a center region indicated by symbol B and the plate thickness in a region indicated by symbol C where the rear ends 3Ab, 3Bb are positioned. In the region C where the rear ends 3Ab, 3Bb are positioned, fragile deformation portions 60, 60 which are deformed later than the front ends 3Aa, 3Ba when the collision load is applied to the front ends 3Aa, 3Ba are respectively formed. In this embodiment, the fragile deformation portions 60, 60 are constituted of opening portions 61 which penetrate fan portions in the vehicle-body vertical direction. Here, the fan portions are positioned closer to a front side of the vehicle body than the rear end mounting portions 3Ac, 3Bc mounted on the dash cross member lower members 15A, 15B using bolts 55 in the drawing.

In this embodiment, the fragile deformation portions 60, 60 are formed by forming the opening portions 61, 61 in the respective rear ends 3Ab, 3Bb positioned in the region C. However, the fragile deformation portions 60, 60 may be formed by a technique which partially decreases a plate thickness of the region C, fox example, without forming opening portions.

Figure 6:
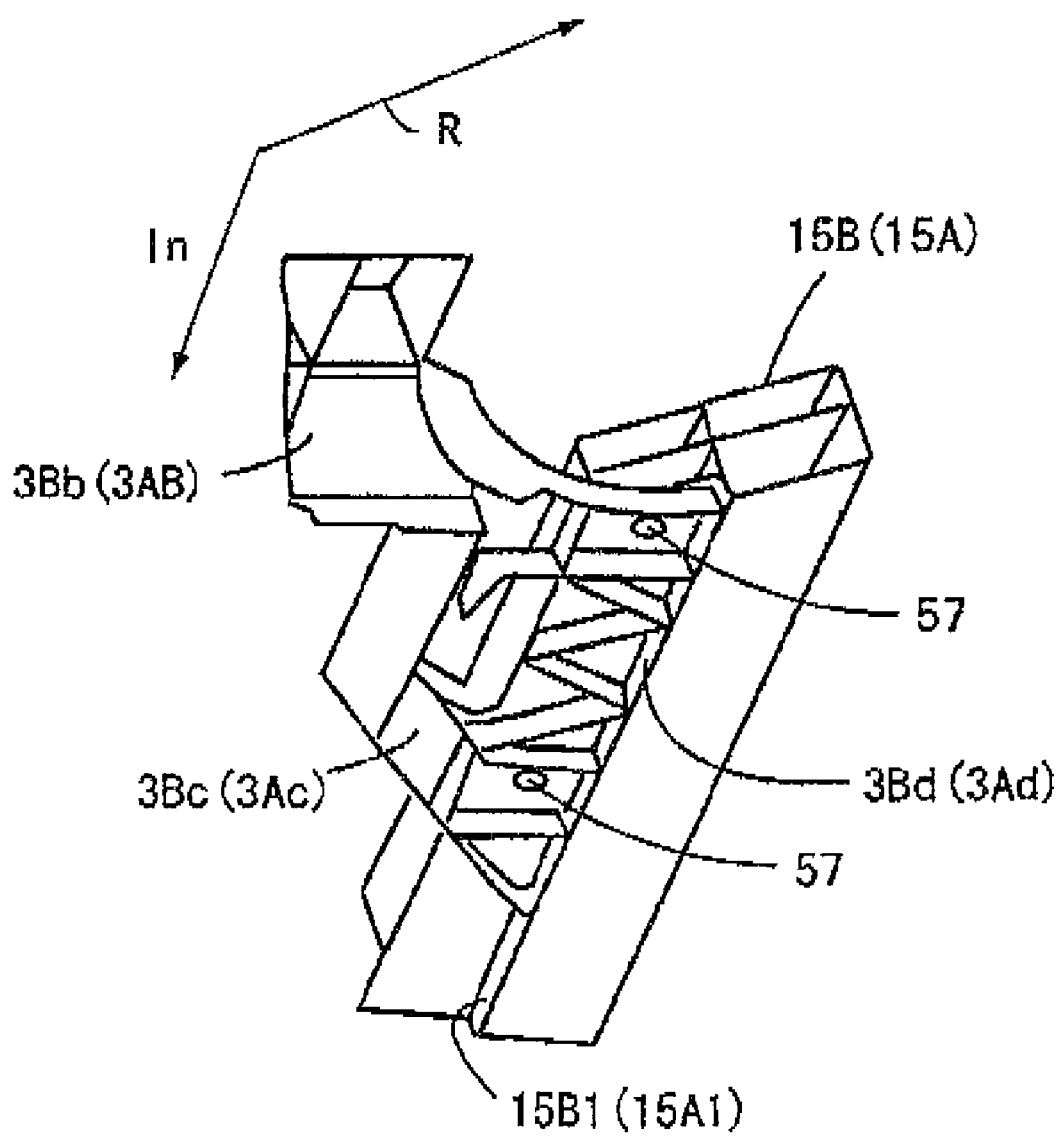
FIG. 6 is an enlarged view showing a mounting portion of a rear end of the front-side-member lower member and a dash cross member.
Figure 7:
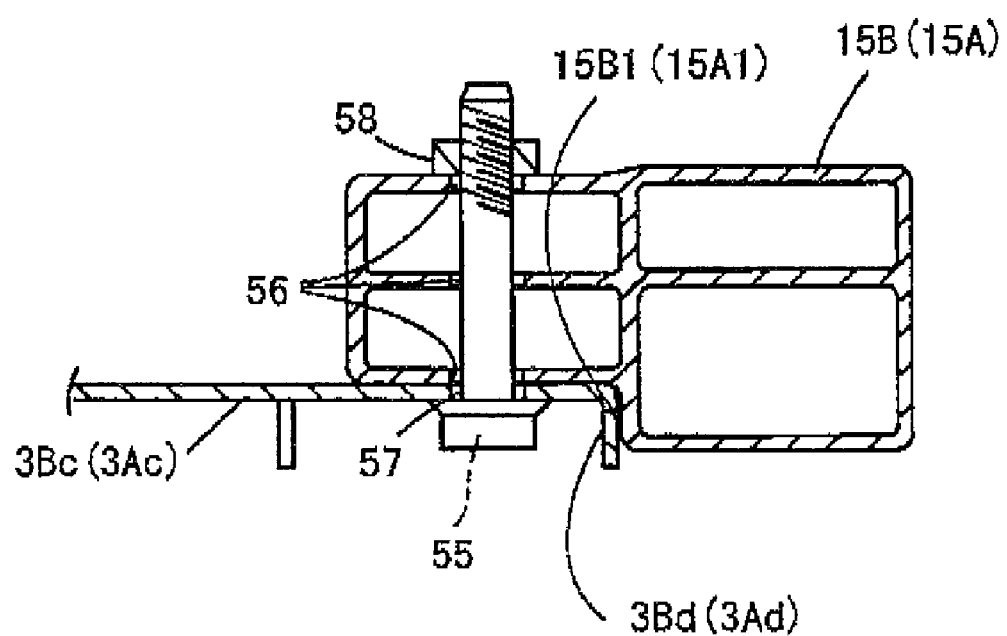
FIG. 7 is a cross-sectional view of a mounting state of the rear end of the front-side-member lower member and the dash cross member.

Next, the mounting structure of a rear end side of the front-side-member lower member 3 is explained. In the respective dash cross members 15A, 15B, as shown in FIG. 6 and FIG. 7, on the rear end mounting portions 3Ac, 3Bc formed on the rear ends 3Ab, 3Bb of the front-side-member lower member 3, the wall portions 15A1, 15B1 which can be brought into contact with the vehicle-body rear side R are formed. The respective dash cross members 15A, 15B are formed by extrusion molding and hence, the formation of a cross-sectional shape of the dash cross members 15A, 15B possesses a high degree of freedom compared to press forming whereby the wall portions 15A1, 15E1 can be easily formed at a low cost. In the wall portions 15A1, 15B1 and the rear end mounting portions 3Ac, 3Bc, holes 56, 57 into which bolts 55 are inserted are respectively formed. To upper surfaces of the dash cross members 15A 15B, pipe nuts 58 are fixed in a collating manner with the holes 56. In this embodiment, the rear end mounting portions 3Ac, 3Bc are respectively fixed to the wall portions 15A1, 15B1 using two bolts 55. The rear end mounting portions 3Ac, 3Bc are formed in cross-sectional shapes which conform to the wall portions 15A1, 15B1, and the rear end surfaces 3Ad, 3Bd are fixed to the wall portions 15A1, 15B1 in a contact manner.

According to the vehicle-body structure having such constitution, the rear ends 3Ab, 3Bb of the front-side-member lower member 3 are connected to the pair of side sills 17, 17 which are arranged in the vehicle-body widthwise direction W and extend in the vehicle-body longitudinal direction and the floor side members 40, 40 arranged parallel to the side sills and hence, the collision energy at the time of collision inputted to the front side members 1, 1 is dispersed to the front-side-member upper members 2 and the front-side-member lower member 3. Further, the collision energy transmitted to the front-side-member lower member 3 is transmitted to the rear ends 3Ab, 3Bb from the front ends 3Aa, 3Ba, and is dispersed to the side sills 17, 17 and the floor side members 40, 40 respectively. In such a transmission path, the region A where the front ends 3Aa, 3Ba which possess the least strength in the front-side-member lower member 3 are positioned is firstly deformed and collapses toward a rear side and hence, the collision energy at the time of collision is absorbed. When the collision energy cannot be absorbed by the collapse in the region A, due to the formation of the opening portions 61, 61, the fragile deformation portions 60, 60 are formed and hence, the region C is deformed and collapses toward a rear side whereby the collision energy is absorbed and, at the same time, the collision energy is transmitted to the side sills 17, 17 and the floor side members 40, 40 respectively in a dispersed manner. Accordingly, compared to the constitution of the related art, it is possible to transmit and disperse the collision energy toward the rear side of the vehicle body more efficiently. Further, the collision energy transmitted to the front-side-member lower member 3 is dispersed to the respective side sills 17, 17 and the respective floor side members 40 and hence, the strength of the whole front-side-member lower member 3 can be lowered compared to the strength of a front-side-member lower member of the related art whereby the plate thickness of the front-side-member lower member 3 can be decreased thus realizing the reduction of weight of the vehicle body.

On the dash cross members 15A, 15B, the wall portions 15A1, 15B1 which can be brought into contact with the rear end mounting portions 3Ac, 3Bc of the front-side-member lower member on the rear side R of the vehicle body are formed. Accordingly, when the collision energy is transmitted to the front-side-member lower member 3, the rear end mounting portions 3Ac, 3Bc are brought into contact with the wall portions 15A1, 15B1 and hence, the strength of the rear ends 3Ab, 3Bb of the front-side-member lower member 3 is increased due to such wall portions whereby it is possible to enhance the absorption performance of collision energy and the collapse property at the time of collision without increasing the number of parts and the assembling man-hours and without increasing the weight.

The rear ends 3Ab, 3Bb are joined to the dash cross members 15A, 15B which are connected to the respective side sills 17 and the respective floor side members 40 and hence, the dash cross members 15A, 15B can be joined to the vehicle bodies which differ in the distance between the respective side sills 17 and the respective floor side members 40 without particularly changing the shape of the rear end of the front-side-member lower member 3. Accordingly, it is possible to realize the use of parts in common along with the acquisition of the reduction of weight while maintaining the efficient transmission and dispersion property of the collision energy at the time of collision toward the rear side of the vehicle body.

The rear end mounting portions 3Ac, 3Bc of the rear ends 3Ab, 3Bb are formed in a cross-sectional shape which conforms to the wall portions 15A1, 15B1, and the rear end surfaces 3Ad, 3Bd are respectively fixed to the dash cross members 15A, 15B to be in contact with the wall portions 15A1, 15B1 and hence, the rear end mounting portions 3Ac, 3Bc and the wall portions 15A1, 15B1 are originally brought into face contact with each other whereby the rigidity of the rear ends 3Ab, 3Bb of the front-side-member lower member can be further increased. This implies that the collision energy is more easily and more directly transmitted to the dash cross members 15A, 15B thus providing the structure which further enhances the dispersion of the collision energy to the respective side sills 17 and the respective floor side members 40.

Since the region A of the front ends 3Aa, 3Ba of the front-side-member lower member 3 is made more fragile than the region C of the rear ends 3Ab, 3Bb of the front-side-member lower member 31 when the collision energy is transmitted to the front-side-member lower member 3 from the front side member 1, the front ends 3Aa, 3Ba of the front-side-member lower member 3 can be surely deformed thus absorbing the collision energy at an early stage. Further, by respectively forming, in the region C on the rear-end 3Ab, 3Bb side of the front-side-member lower member 3, the fragile deformation portions 60 which are is deformed later than the front ends 3Aa, 3Ba when the collision load is applied to the front ends 3Aa, 3Ba, the collision energy which is transmitted to the front-side-member lower member 3 but cannot be absorbed by the deformation of the region A on the front ends 3Aa, 3Ba can be absorbed by the deformation of the fragile deformation portions 60 and hence, the property for transmitting and dispersing the energy at the time of collision toward the rear side of the vehicle body more efficiently can be maintained.

Figure 8:
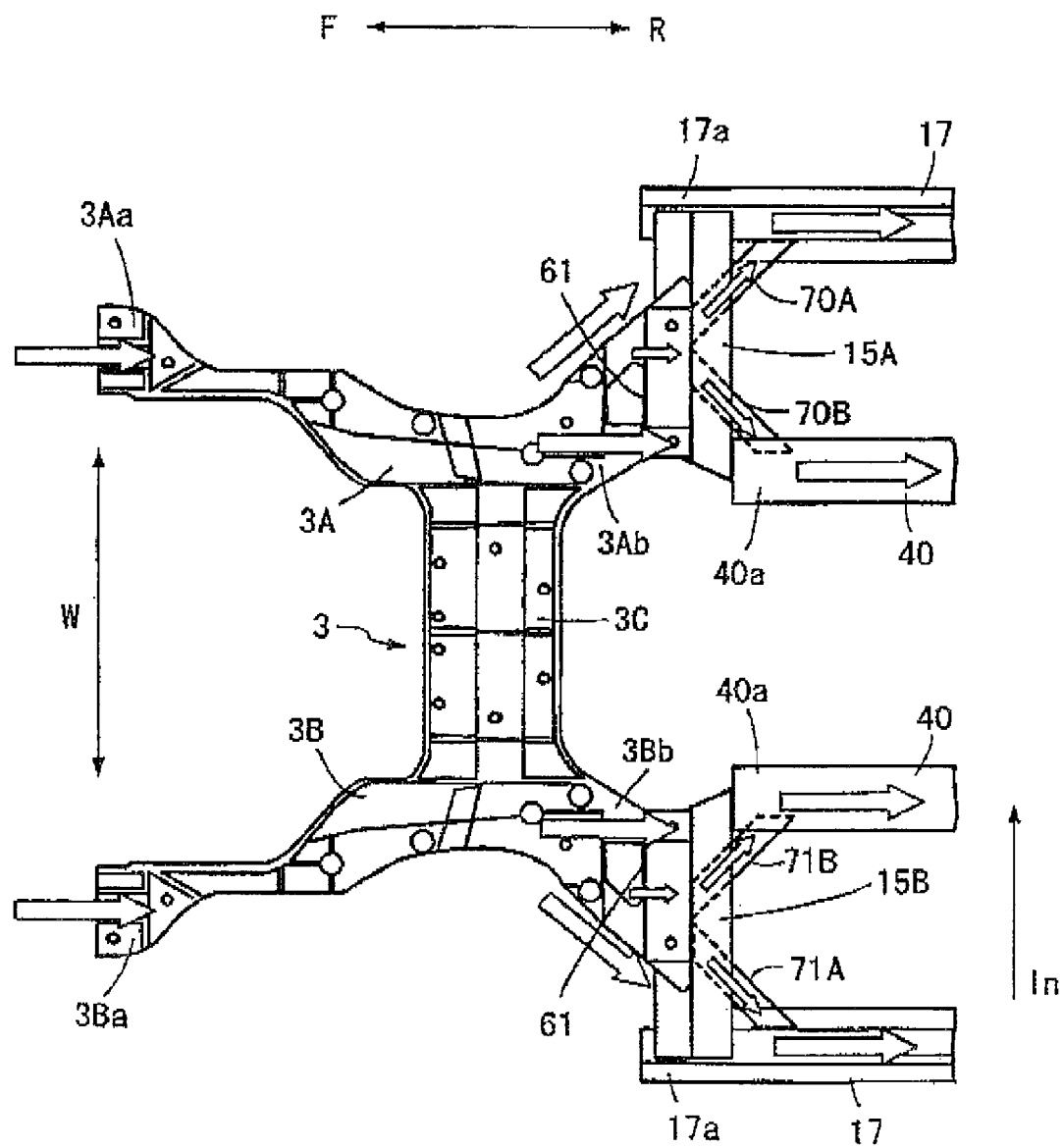
FIG. 8 is a plan view showing the vehicle body structure according to another embodiment of the present invention as viewed from below the vehicle body.

FIG. 8 shows another embodiment of the present invention. In this embodiment, the dash cross member 15A, the side sill 17 and the floor side member 40 are connected with each other by a plurality of support strut members 70A, 70B, and the dash cross member 15, the side sill 17 and the floor side member 40 are connected with each other by a plurality of support strut members 71A, 71B1. The support strut members 70A, 70B have front ends thereof respectively connected to the center portion of the dash cross member 15A and another ends thereof respectively connected to the side sill 17 and the floor side member 40 in a spreading manner toward the rear side of the vehicle body. The support strut members 71A, 71B have front ends thereof respectively connected to the center portion of the dash cross member 15B and another ends thereof respectively connected to the side sill 17 and the floor side member 40 in a spreading manner toward the rear side of the vehicle body.

Due to such a constitution, it is possible to more efficiently transmit the collision energy inputted to the front-side-member lower member 3 to the left and right side sills 17 and floor side members 40 respectively by way of the support strut members 70A, 70B and the support strut members 71A, 71B respectively.

What is claimed is:

1. A vehicle body structure, comprising:
    a pair of front side members, front ends of which are joined to both ends of a front bumper via impact absorbing portions, respectively;
    front-side-member upper members, which are arranged above the front side members, and front ends of which are connected to the front side members, respectively;
    a front-side-member lower member, which is arranged below the front side members, and which has a base portion, a pair of first arm portions, and a pair of second arm portions, the pair of first arm portions extending towards a front side of a vehicle body from the base portion, the pair of second arm portions extending towards a rear side of the vehicle body from the base portion, front ends of the pair of first arm portions being connected to the front-side-member upper members, respectively, and a rear end of each of the pair of second arm portions being provided with a first horizontal portion and a first vertical wall portion extending from an end of the first horizontal portion;
    a first dash cross member, which extends in a widthwise direction of the vehicle body, and to which one of the rear ends of the pair of second arm portions is joined; and
    a second dash cross member, provided separately from the first dash cross member, and which extends in the widthwise direction of the vehicle body, and to which the another one of the rear ends of the pair of second arm portion is joined, wherein
    each of the first and second dash cross members includes a second horizontal portion and a second vertical wall portion, extending from the second horizontal portion,
    wherein the first horizontal portion is fixedly joined to the second horizontal portion, and the first vertical wall portion has a shape conforming to the corresponding second vertical wall portion and is in contact with the second vertical wall portion, and wherein
    each of the first dash cross member and the second dash cross member is connected to
        respective one of a pair of side sills, the pair of side sills being arranged in the widthwise direction of the vehicle and extending in a longitudinal direction of the vehicle, and
        respective one of floor side members, the floor side members being arranged parallel to the side sills.

2. The vehicle body structure according to claim 1, further comprising:
    a support strut member that extends between one of the first and second dash cross members and a side sill to connect the dash cross member to the side sill.

3. The vehicle body structure according to claim 1, further comprising:
    a support strut member that extends between one of the first and second dash cross members and a floor side member to connect the dash cross member to the floor side member.

4. The vehicle body structure according to claim 1, wherein the front-side-member lower member is provided with recessed portions that prevent the front-side-member lower member from interfering with front wheels.

5. The vehicle body structure according to claim 1, wherein a strength of front portions of the pair of first arm portions against a force in a direction against a front end of the vehicle body is weaker than a strength of rear portions of the pair of second arm portions against the force.

6. The vehicle body structure according to claim 5, wherein the strength of the front portions of the pair of first arm portions against the force is weaker than a strength of the base portion against the force.

7. The vehicle body structure according to claim 1, wherein each of the pair of second arm portions is provided with a fragile deformation portion.

8. The vehicle body structure according to claim 7, therein the fragile deformation portion is an opening that penetrates a second arm portion.

\* \* \* \* \*